May 6, 1969   CLAUDE-EDMOND LOMBARD   3,443,135
ROTARY-MAGNET VARIABLE-VOLTAGE ALTERNATOR, ESPECIALLY
APPLICABLE TO THE POWER-TRANSMISSION
CONTROL OF AUTOMOBILE VEHICLES
Filed May 9, 1966                                   Sheet 1 of 2
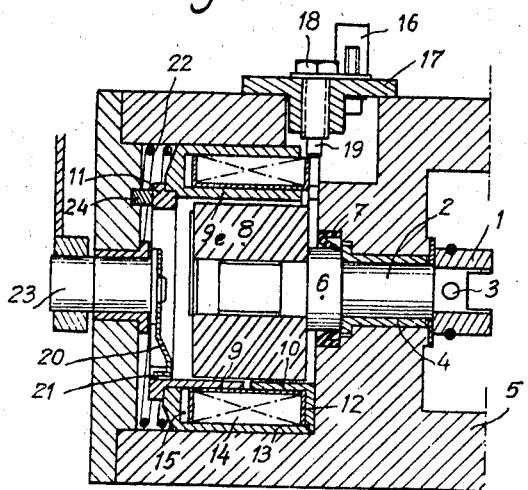
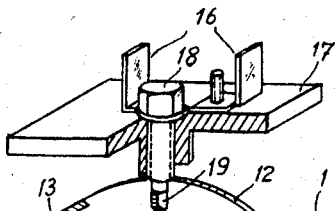
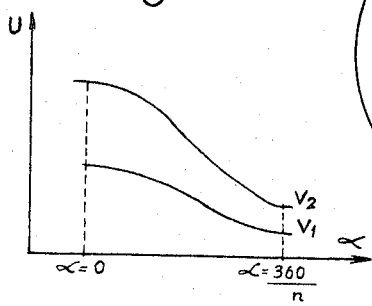
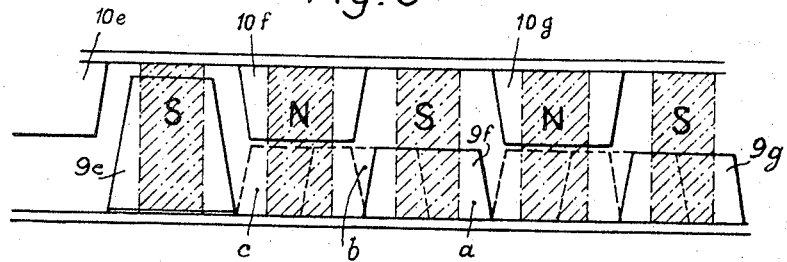

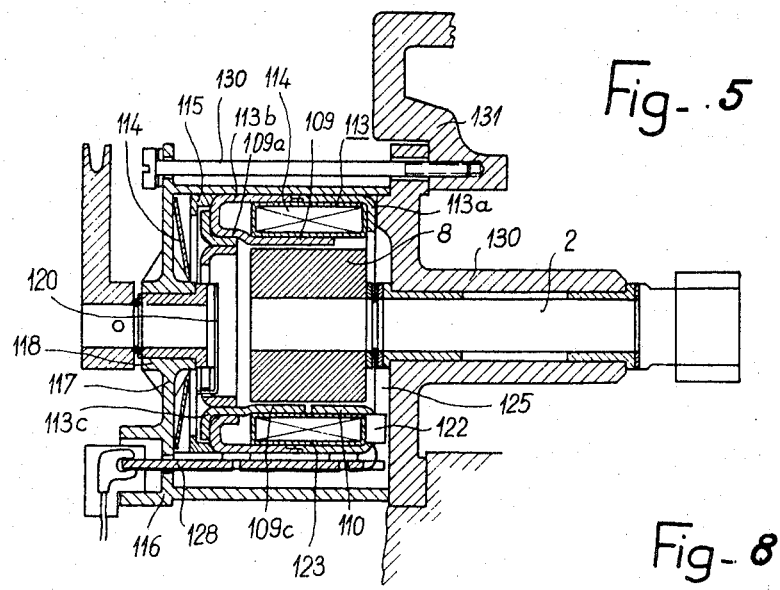
Fig. 5
Fig. 8
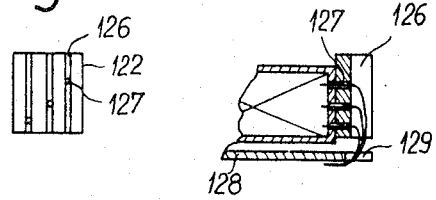
Fig. 7
Fig. 9
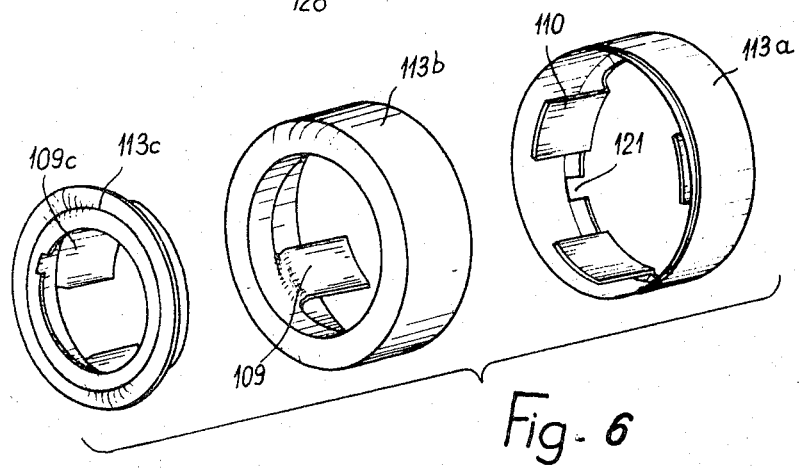
Fig. 6

United States Patent Office 3,443,135
Patented May 6, 1969

3,443,135
ROTARY-MAGNET VARIABLE-VOLTAGE ALTERNATOR, ESPECIALLY APPLICABLE TO THE POWER-TRANSMISSION CONTROL OF AUTOMOBILE VEHICLES
Claude-Edmond Lombard, Billancourt, France assignor to Regie Nationale des Usines Renault, Billancourt, France, a French works
Filed May 9, 1966, Ser. No. 548,462
Claims priority, application France, May 12, 1965, 16,784
Int. Cl. H02k 21/12
U.S. Cl. 310—191                               8 Claims

ABSTRACT OF THE DISCLOSURE

An alternator particularly useful in servo-control systems for operating the power transmission of an automobile engine. There is provided means for maintaining the output voltage of the alternator between a set of predetermined limits, the means comprising a set of pole pieces of the same polarity wherein only a limited number of such pole pieces are movable. There is also provided means for varying the output of the alternator in response to the load on the engine.

---

U.S. patent application Ser. No. 438,902 of Mar. 11, 1965, now Patent No. 3,344,294, issued Sept. 26, 1967, relates to a servo-control device operating the power transmission of an engine, especially on automobile vehicles, this servo-control being obtained by means of an alternator, the ouput voltage of which is a function on the one hand of the speed of the vehicle or of the speed of rotation of the engine and, on the other hand, of the load on the engine, which makes it possible to adapt automatically the step-down gearing ratio between the motor and the power output shaft in a continuous or non-continuous manner.

In particular, a device of this kind consists of a tachometer alternator with a permanent magnet, in which the poles of the same kind of the stator are given an angular displacement movement with respect to the others.

The alternator with poles of the same kind which are angularly displaceable by a unit described in the above-mentioned patent operates correctly as a whole, especially on a vehicle, in its opplication to the power transmission control between the engine and the driving wheels.

It has however been found that when it is utilized with a relatively-high ratio (of the order of 3) of the speed of passage with the foot hard down on the accelerator to the speed of passage with the foot lifted, an angular variation of the setting of the poles by a small amount (of the order of 1° produces a considerable difference (of the order of 6 to 7%) from the speed of passage with the foot hard down. This drawback could obviously be overcome by putting in position an accurate abutment and by eliminating all the internal play.

In order to obtain an alternator which has naturally between its end positions a rate of voltage variation in the vicinity of that desired, with a low angular sensitivity at the limits, the object of the present invention consists of an alternator in which only a part of the poles of the same kind is displaced, for example, in the case of a six-pole machine, two poles out of three are displaced, which gives the desired ratio in the vicinity of 3.

The pole which is not movable can under these conditions cover more than half the length of the magnet, which correspondingly increases the voltage delivered by the machine, but reduces the load factor of the engine. By the combination of these two parameters, it is thus possible to obtain the desired load factor.

The invention is also characterized by the arrangement and the form of the poles which enable the desired law to be obtained for the variation of the output voltage of the machine as a function of the load on the engine.

In order to permit the displacement of part of the poles of the same kind of the machine with respect to the others with an adequate and smooth action, the form of the displaceable poles, and also that of the oppositely-facing poles must be such that there is no inter-penetration, that is to say in fact, each of the displaceable poles and their opposite numbers can only cover about one-half of the length or the thickness of the magnet.

A tachometer alternator according to the invention can thus deliver, in its position of maximum useful flux, only about half the voltage of a conventional machine, and this remains true irrespective of the shape of the poles: trapezoidal, triangular, of stepped form, etc.

The invention is also directed to an economic form of construction of the alternator by the use of stamped stator parts; it also covers the means utilized for leading-out the wires of the winding to the apparatus controlled.

In order that the invention may be more clearly understood, one particularly advantageous form of embodiment will now be described, it being however understood that this form is only given by way of example and without limitation.

In the accompanying drawings:

FIG. 1 is an axial section of an alternator according to the invention with a stator having a single coil, the axis of which is that of the rotor magnet;

FIG. 2 is a perspective view, with parts broken away, of the alternator shown in FIG. 1;

FIG. 3 is a partial developed view of the pole pieces of the stator and the poles of the magnet, intended to define the ratios of dimensions utilized and also the operation;

FIG. 4 is a graph showing, for two speeds of rotation of the rotor, the curves representing the voltage supplied by the alternator as a function of the angular displacement of the stator parts;

FIG. 5 is an axial section similar to FIG. 1 showing the utilization of stamped parts;

FIG. 6 is an exploded view of the ring;

FIG. 7 is a detail view of the shoulder for the outlet of the wires;

FIG. 8 is a detail view of the printed circuit;

FIG. 9 is a view in section showing the outlet of the coil wires.

In FIG. 1, the coupling of the alternator to an output shaft of a gear-box or a shaft of the vehicle engine is obtained by any known driving system, shown in this case by the parts 1, 2 and 3. The shaft 2 rotates in a bearing 4 of sintered metal, held by a casing 5 of non-magnetic material enclosing the alternator. The shaft 2 carries a shoulder 6 which, in association with a lip joint 7 carried by the casing 5, ensures the fluid-tightness of the alternator. Beyond the shoulder 6, the shaft 2 carries a cylindrical multi-polar magnet 8, magnetized along its periphery alternately north and south. The magnet carries for example three north poles and three south poles.

The pole pieces of the stator have the shape of fingers of magnetic material. There are three right-hand fingers 10 and three left-hand fingers 9 of which two only 9f and 9g are affected by the angular displacement (see FIG. 3). The left-hand finger 9e can cover more than half the length of the magnet as can be seen from FIGS. 1 and 3; the other fingers cover less than half the length of the magnet.

The finger 9e and the three fingers 10 are fixed with respect to the casing 5. At the maximum flux, the three left-hand fingers 9 and the three right-hand fingers 10 are equidistant. The fixed right-hand fingers 10 are extended by a ring 12, while the two movable fingers 9f and 9g are extended by the ring 11 which can rotate in the shouldered ring 13 which recloses the flux by enclosing a coil 14 mounted on an insulating frame 15, the internal diameter of which is slightly greater than the external diameter of the fingers 9 so as to permit these latter to move freely. The coil outlets are effected by small tongues 16 fixed on an insulator 17 attached in turn to the casing by a screw 18, the extremity 19 of which also fixes in rotation the fixed pole pieces 10 and the ring 12.

The angular position of the ring 11 and of the fingers or pole pieces 9 is controlled by the intermediary of a member 20 forming a lever, and which is housed in a slot 21 of the ring 11. The ring 11 is held axially against the shouldered ring 13 by the magnetic forces and also by a fixed abutment 24 which prevents any possible tilting due to the magnetic unbalance in certain positions of the ring 11. The ring 13 is held in the casing by the pressure of a coil spring 22.

The lever 20 is fixed (for example by insetting) to a shaft 23, the angular position of which is associated with the load on the engine (this will be, for example, a part of the coupling to the accelerator pedal).

There is again found in FIG. 2 most of the elements of FIG. 1. The greater part of the casing 5 and of the shouldered ring 13 has been removed for the sake of clearness of the drawing. There is clearly shown, in particular, the shape of the pole pieces 9 and 10 and that of the lever 20.

In FIG. 3, which is a developed view of the pole pieces of the rotor and the stator, there can be distinguished three fixed pieces 10e, 10f, 10g, and two movable pieces 9f and 9g. The parts of the developed surface of the magnet which are definitely polarized, have been shown by shaded zones in this figure.

In operation, the magnetic flux due to one pole of the magnet passes through the air-gap and through the tooth of the stator located opposite, follows the ring so as to pass out through the teeth adjacent to the first, located on the other side of the ring, and returns to the poles adjacent to the above-mentioned pole which have the opposite polarity.

When the pole pieces 9 occupy the position $a$, the flux is a maximum, both in the fixed pole pieces and in the moving pole pieces; the voltage of the alternator is a maximum.

When the pole pieces 9f and 9g occupy the position $c$, the pieces 9f and 9g on the one hand and 10f and 10g on the other receive a flux of the same sign and the voltage of the alternator is a minimum. This minimum is not zero and depends, inter alia, on the number of poles 9 which are subject to displacement.

In the intermediate positions $b$, the voltage has a value which is also intermediate.

While respecting dimension ratios between the useful width of the poles of the magnet and the dimensions of the trapeziums which constitute the stator pole pieces, it is possible simultaneously to preserve a sinusoidal waveform of the alternator output and to obtain the desired law of voltage variation as a function of the angle.

In a practical form of construction of an alternator with six poles, each of the magnet poles occupies an angle of 30° and is separated from its neighbor by an equal space. The large base of the trapezium of each of the pole pieces 9 and 10 represents an angle of 58°, while the small base covers an angle of 50°, except for the pole 9e which retains the same slope on the sides of the trapezium as the other poles. The diameter of the magnet is equal to 1.45 times its length, the single air-gap being equal to 0.03 times the radius of the rotor.

These values are given by way of examples of construction but are not limitative with respect to the invention.

The leading-out of the wires of the coil 14 is preferably effected through a projection of the frame 15 passing through the ring 12 (not shown in FIGS. 1 and 2).

FIG. 4 is a graphic representation of the alternator voltage as a function of the displacement angle for two speeds of rotation V1 and V2; the values obtained for $\alpha=0$ correspond to the position $a$, FIG. 3, of the pole pieces 9f and 9g, the values obtained for the maximum displacement $\alpha=360°/n$. (where $n$ is the number of poles) corresponding to the position $c$ of the pole pieces 9f and 9g.

According to the form of embodiment shown in FIGS. 5 and 6, the ring is constituted by three stamped annular parts: a part 113a formed by an end-piece carrying the fixed fingers 110 of one polarity, a complementary part 113b, also in the form of an end-piece, carrying the fixed finger or fingers 109 of the other polarity (in the example shown, a single finger 109), and a ring 113c frictionally engaged in the preceding, so as to be able to rotate, this ring carrying the moving fingers or poles 109c.

As will be observed, the fixed finger 109 comprises a discontinuous portion 109a. This finger 109 may have a length close to that of the magnet and is narrower by a few degrees than the width of the other fingers, in order to increase the angular travel of the movable pole piece, while the fingers 109c and the fingers 110 can only have a length less than half that of the magnet in order to permit the rotation of the said fingers 109c.

In order to prevent axial displacement of the movable ring 113c, the latter is pushed by an elastic washer 114 supported by an intermediate ring 115 of nylon or other similar material. The whole unit is contained in a cylindrical casing 116, the end portion 117 of which carries and axial bearing 118 for the passage of the control arm having a driving finger 120 engaging in a slot in the ring 113c. The other face of the casing 116 carries the bearing 130 for the driving shaft of the magnet.

The casing 116 has at least one separate widened portion receiving the printed circuits and their connection with the wires leading-out of the coil; as the latter is of the type with a center tapping, it necessitates the leading-out of three wires to the exterior of the apparatus.

To this end, the end-plate 113a carries a slot 121 through which passes a shoulder 122 of the casing 123 which encloses the coil 114.

This shoulder permits simultaneously ensuring the outlet passage of the coil wires without a sheath, and on the other hand ensuring the position of the stator in the casing by being extended into a housing 125 in the bearing support. It is provided on its outer face with three grooves 126, by which the wires pass through the orifices 127 and come down towards the printed circuit plate 128, while being protected from any contact, which avoids the use of flexible outlet sheaths.

From that point, the wires are received in cut-out portions 129 of the printed circuit plate and are welded to the printed conductors.

Screws 130 are provided for fixing the alternator on an appropriate support 131.

What is claimed is:

1. An improvement in alternators, the rotatable field of which is permanently magnetized, of the type having a single stator armature coil coaxial with the rotor and with stator pole pieces coupled in similar polarities to two rings cooperating with a ring for closing the magnetic circuit and forming a ring which contains the armature coil, in which alternate ones of said rings can be displaced angularly with respect to the other for the purpose of varying the voltage of the alternator for a given speed of rotation, the said alternators being characterized in that only a limited number of the poles of a given polarity are made movable, whereas the remaining poles of this polarity are fixed.

2. Improvements in alternators as claimed in claim 1, in which the stator pole pieces cover slightly less than the length of the rotor, whereby it is possible to rotate one of the said rings by one whole pole pitch with respect to the other.

3. Improvements in alternators as claimed in claim 2, in which the pole pieces have a trapezoidal shape.

4. Improvements in alternators as claimed in claim 1, in which the movable stator pole pieces have a length slightly less than one-half the length of the rotor, whereas the fixed pole pieces of the same polarity as the moving pieces have a length approximately equal to the length of the rotor.

5. The alternator as recited in claim 1 wherein the stator comprises three stamped pieces, the first bearing a plurality of fixed teeth of one polarity, the second bearing at least one fixed tooth of a second polarity and the third bearing at least one movable tooth of said second polarity.

6. The alternator as recited in claim 1 wherein the stator comprises three stamped pieces, the first stamped piece being in the form of a ring bearing a plurality of inwardly facing fixed teeth of one polarity, the second stamped piece being in the form of a ring bearing at least one inwardly facing fixed tooth of a second polarity, said first and second rings forming complementary parts, and said third stamped piece being in the form of a ring bearing at least one movable pole of said one polarity, said movable pole penetrating into the center bore of said first ring.

7. The alternator of claim 1 wherein said armature coil is enclosed in a casing a plastic material having a shoulder serving as an output for coil wires and also as means for positioning the stator in the casing which contains the alternator.

8. The invention as recited in claim 7, and further comprising a printed circuit fixed to the stator to which are connected said coil wires passing through said shoulder.

References Cited

UNITED STATES PATENTS

| | | | |
|---|---|---|---|
| 2,610,993 | 9/1952 | Stark | 310—191 |
| 2,629,063 | 2/1953 | Ellis | 310—191 |
| 2,670,448 | 2/1954 | Bell et al. | 310—190 |
| 3,077,548 | 2/1963 | Moressee et al. | 310—191 |
| 3,330,976 | 7/1967 | Brown | 310—191 |
| 3,344,294 | 9/1967 | De Coye De Castelet | 310—191 |

MILTON O. HIRSHFIELD, *Primary Examiner.*

L. L. SMITH, *Assistant Examiner.*

U.S. Cl. X.R.

310—152